No. 703,205. Patented June 24, 1902.
J. G. HODGSON.
MACHINE FOR MANUFACTURING BAIL EARED CANS, PAILS, OR OTHER VESSELS.
(Application filed Oct. 22, 1900.)
(No Model.) 7 Sheets—Sheet 1.

WITNESSES:
INVENTOR
HIS ATTORNEYS.

No. 703,205. Patented June 24, 1902.
J. G. HODGSON.
MACHINE FOR MANUFACTURING BAIL EARED CANS, PAILS, OR OTHER VESSELS.
(Application filed Oct. 22, 1900.)
(No Model.) 7 Sheets—Sheet 3.

No. 703,205. Patented June 24, 1902.
J. G. HODGSON.
MACHINE FOR MANUFACTURING BAIL EARED CANS, PAILS, OR OTHER VESSELS.
(Application filed Oct. 22, 1900.)
(No Model.) 7 Sheets—Sheet 4.
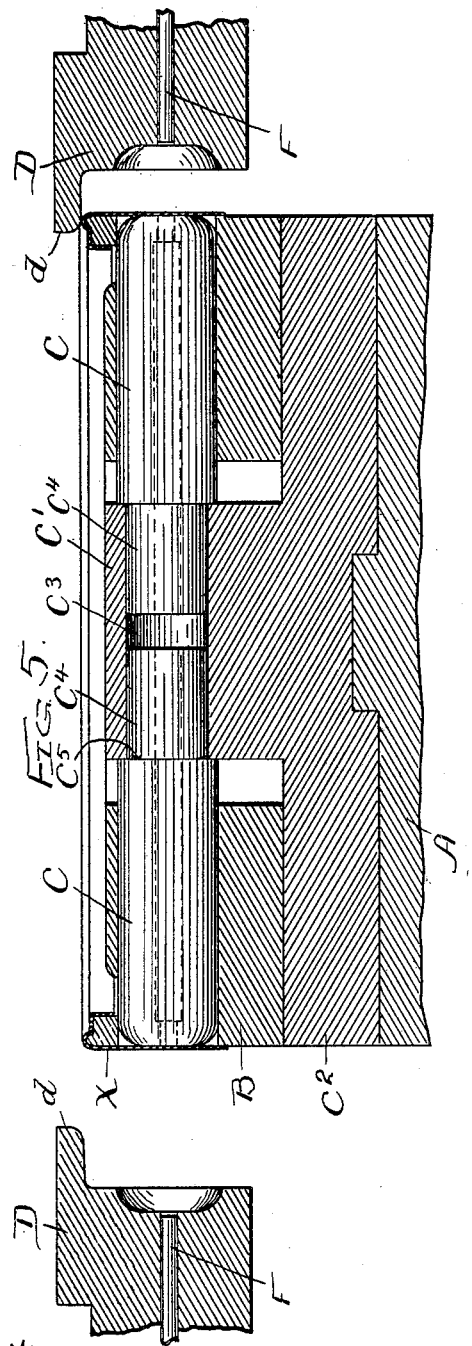
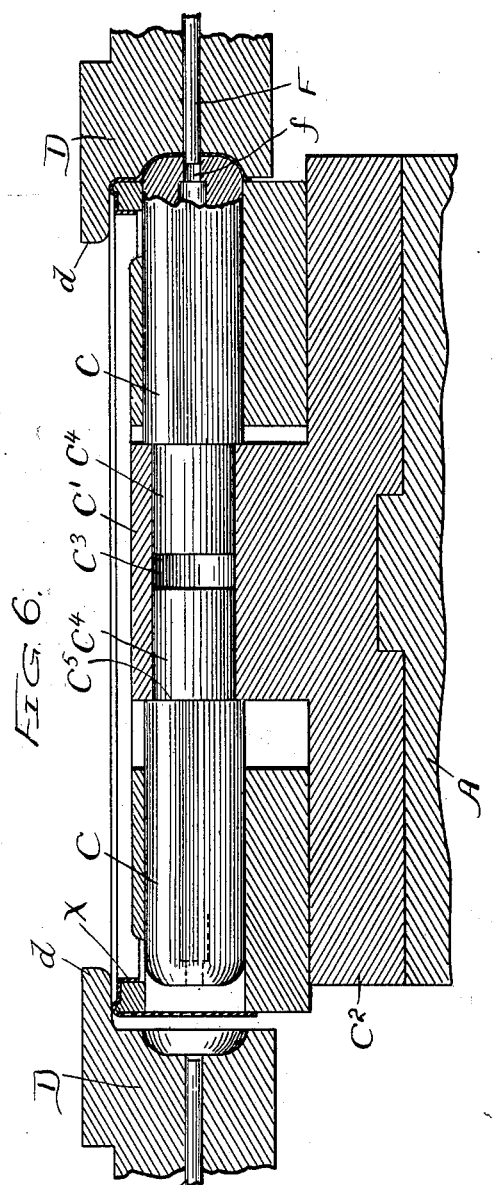
WITNESSES:
Lew. E. Curtis
H. M. Munday
INVENTOR.
John G. Hodgson.
BY Munday, Evarts & Adcock
HIS ATTORNEYS.

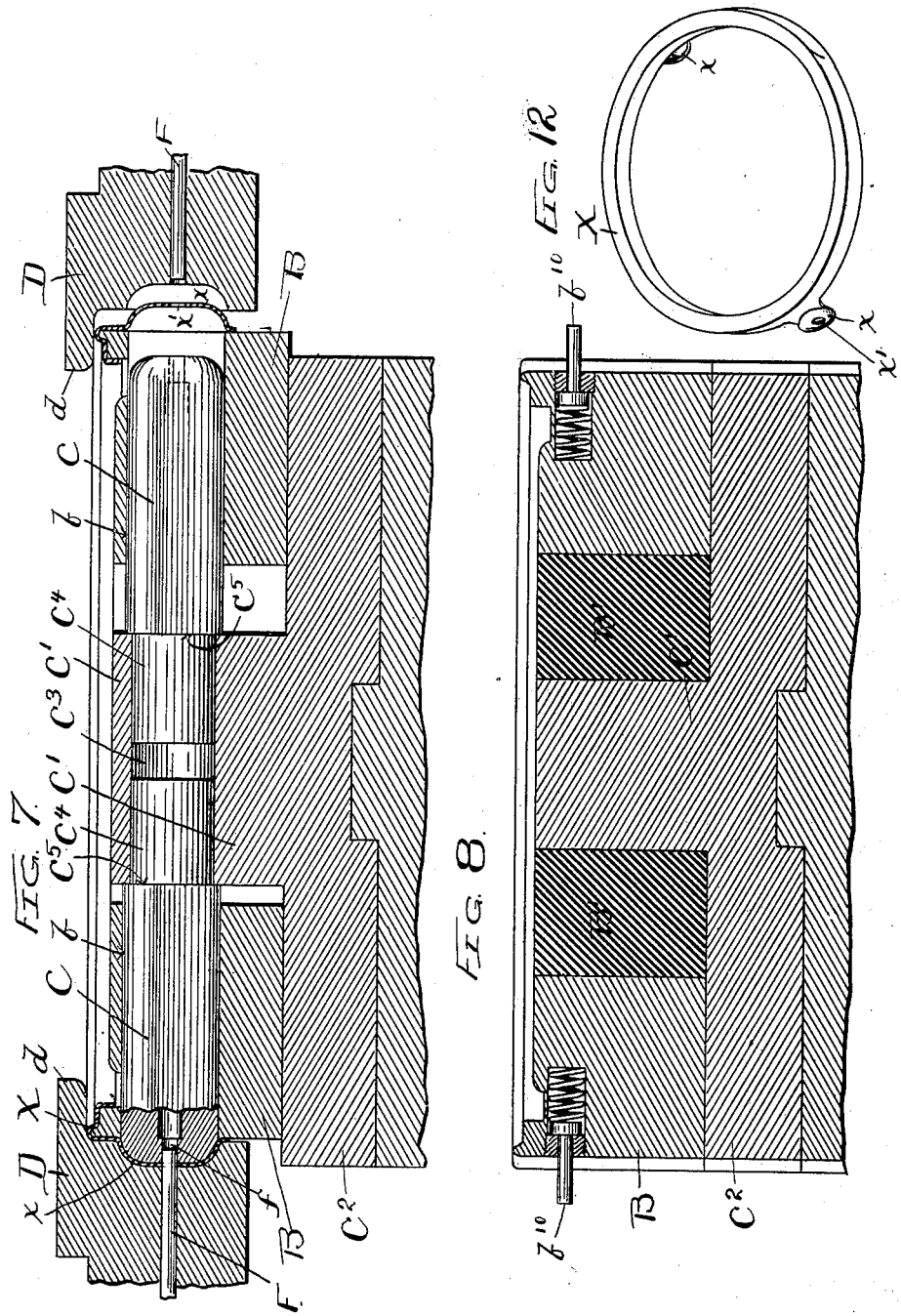

No. 703,205. Patented June 24, 1902.
J. G. HODGSON.
MACHINE FOR MANUFACTURING BAIL EARED CANS, PAILS, OR OTHER VESSELS.
(Application filed Oct. 22, 1900.)
(No Model.) 7 Sheets—Sheet 6.
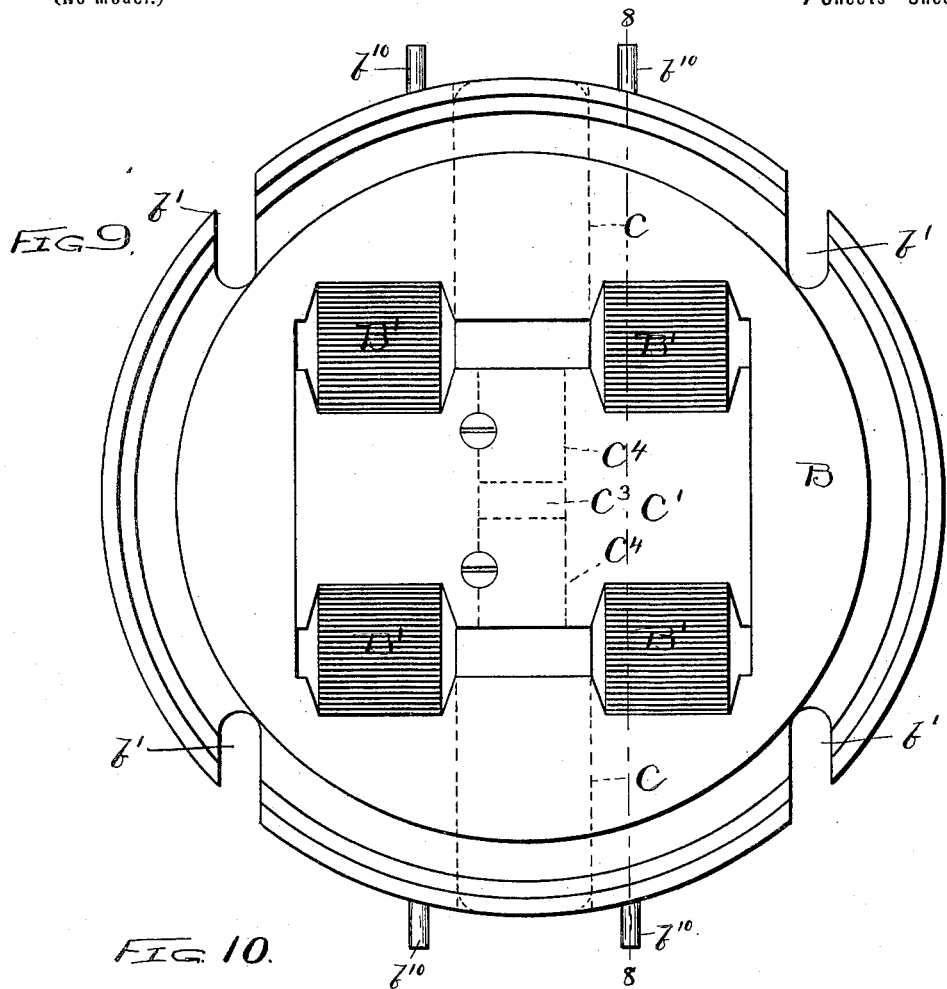
FIG 9.
FIG 10.
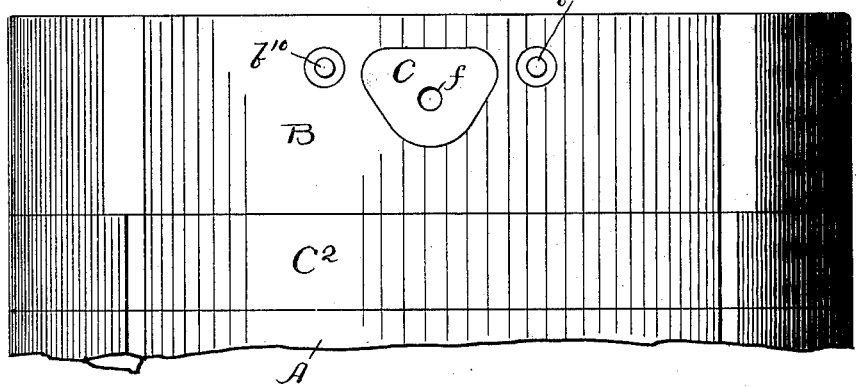
WITNESSES:
Lew. E. Curtis
H. W. Munday
INVENTOR
John G. Hodgson
By Munday, Evarts & Adcock
HIS ATTORNEYS.

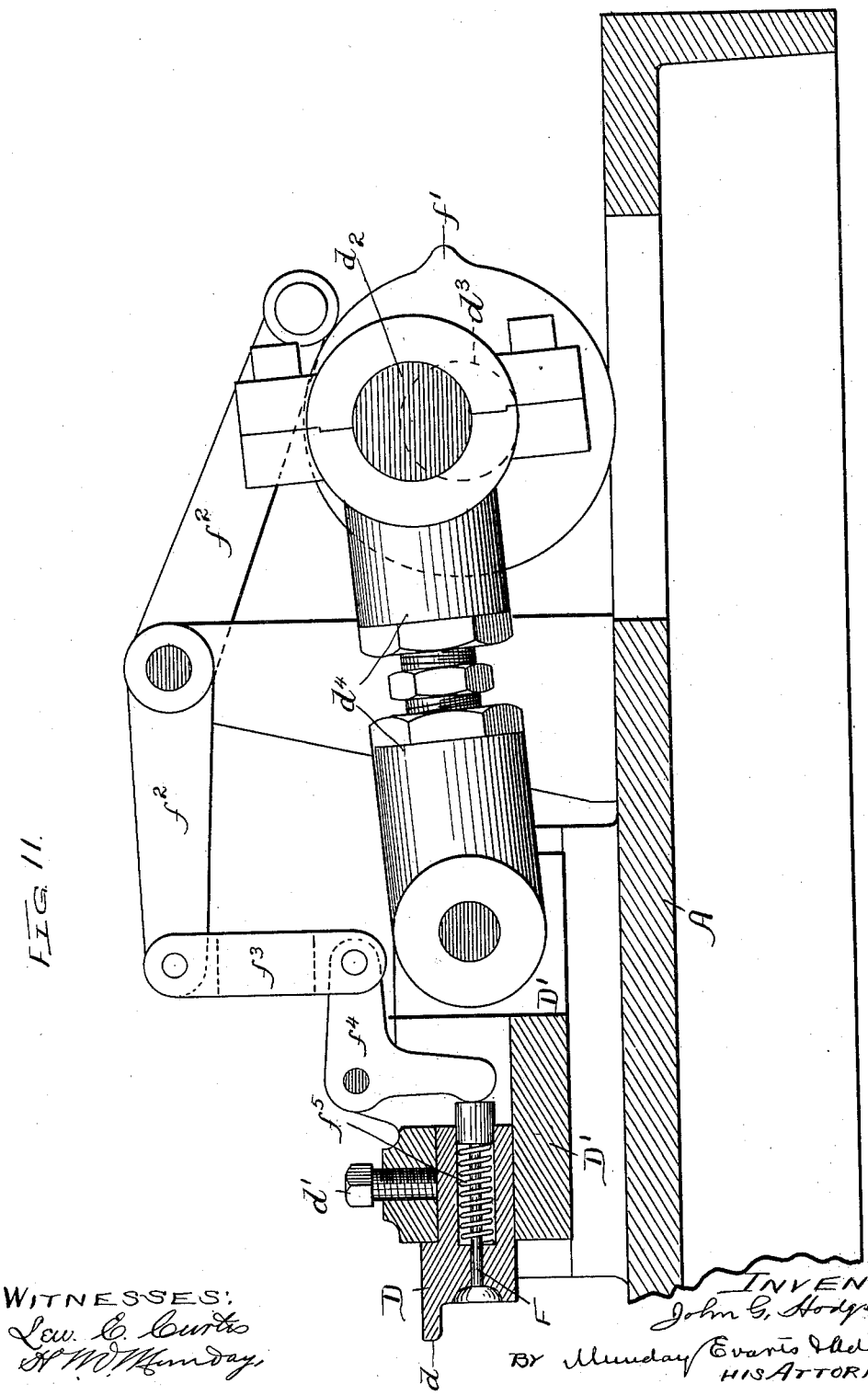

UNITED STATES PATENT OFFICE.

JOHN G. HODGSON, OF MAYWOOD, ILLINOIS, ASSIGNOR, BY MESNE ASSIGNMENTS, TO AMERICAN CAN COMPANY, OF JERSEY CITY, NEW JERSEY, A CORPORATION OF NEW JERSEY.

MACHINE FOR MANUFACTURING BAIL-EARED CANS, PAILS, OR OTHER VESSELS.

SPECIFICATION forming part of Letters Patent No. 703,205, dated June 24, 1902.

Application filed October 22, 1900. Serial No. 33,968. (No model.)

*To all whom it may concern:*

Be it known that I, JOHN G. HODGSON, a citizen of the United States, residing in Maywood, in the county of Cook and State of Illinois, have invented a new and useful Improvement in Machines for Manufacturing Bail-Eared Cans, Pails, or other Vessels, of which the following is a specification.

This invention relates to the manufacture of sheet-metal cans, pails, or other vessels having ears for receiving bails. Its object is to provide an automatic machine of a simple, efficient, and durable construction by means of which the bail-ears may be made integral with the head, top portion, ring, or breast of the can itself.

The machine embodying the invention comprises in coöperative combination a movable work-holder adapted to fit within, receive, and support the head, ring, or breast of a can, pail, or other vessel upon which the bail-ears are to be formed integral therewith, a pair of interior ear-forming male dies mounted within said holder and upon which or in respect to which the holder may slide or reciprocate, and a pair of reciprocating exterior ear-forming male dies to form alternately first one bail-ear and then the other. The invention also consists in the novel construction of parts and devices and in the novel combinations of parts and devices herein shown and described, and specified in the claims.

Figure 1:
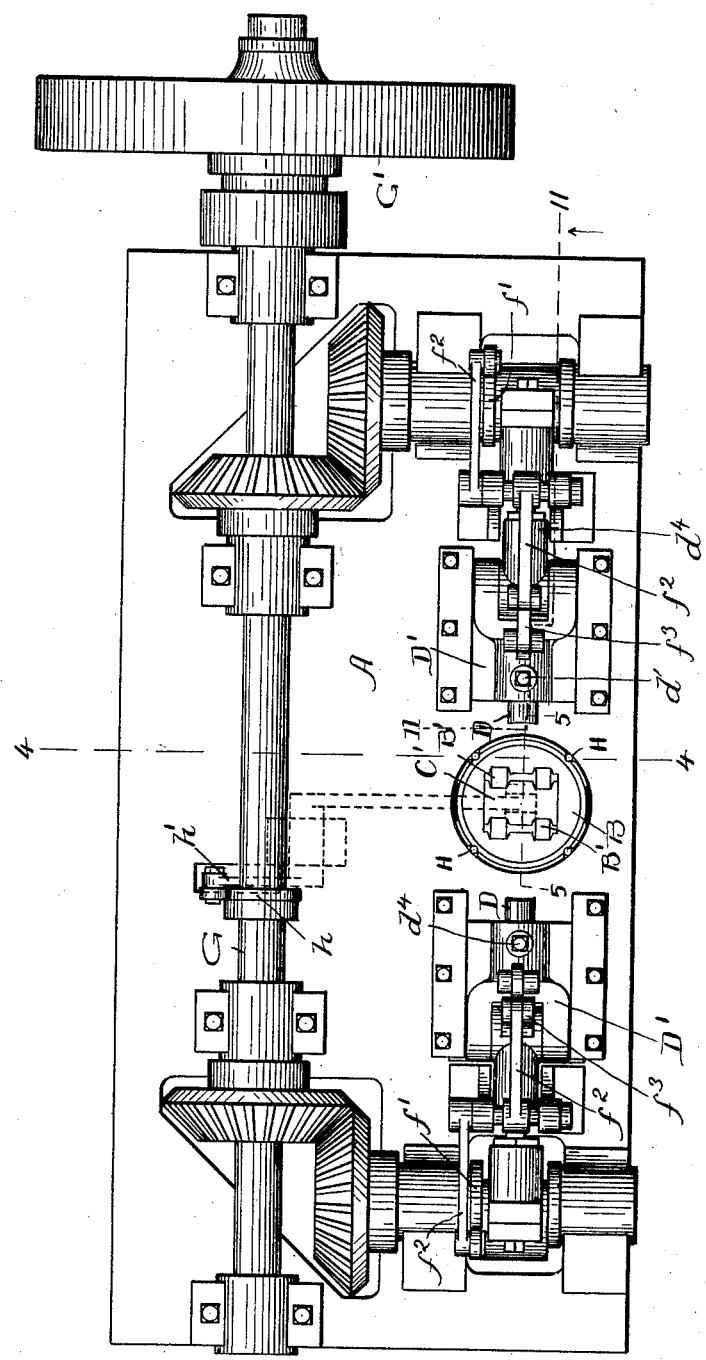
Figure 2:
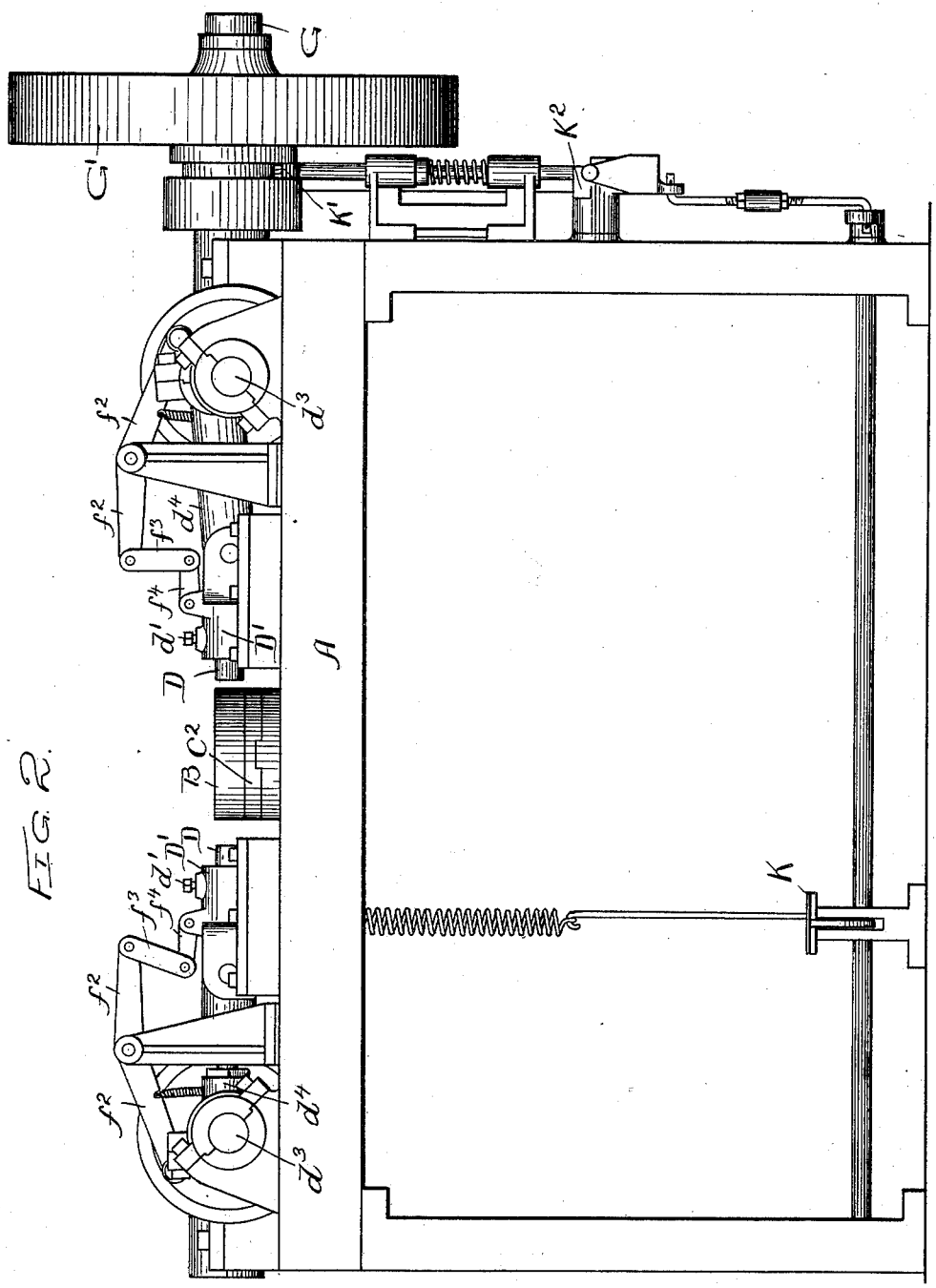
Figure 3:
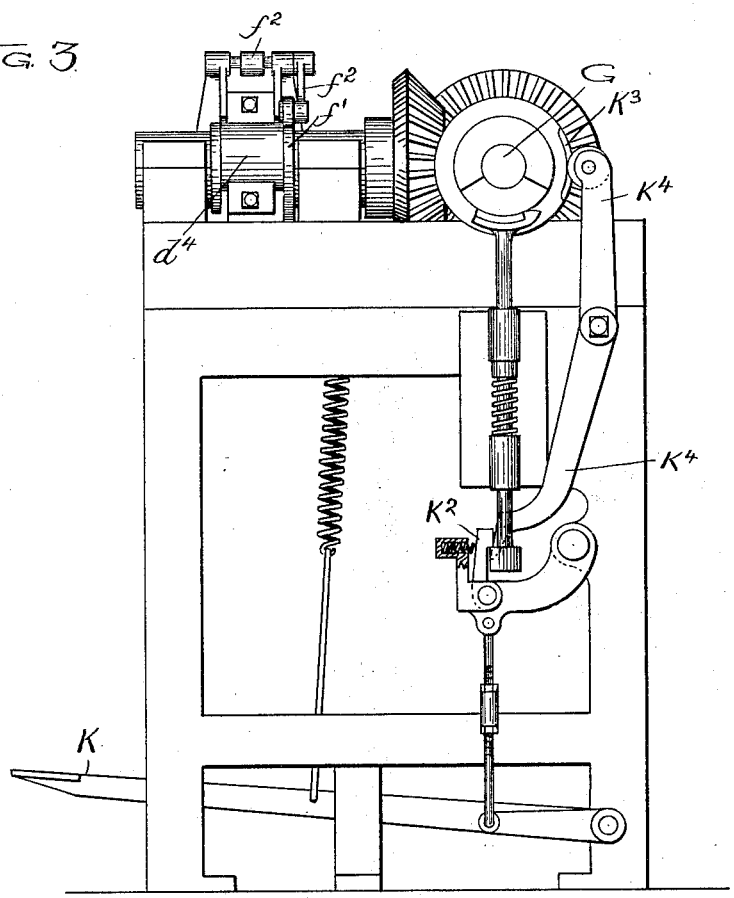
Figure 4:
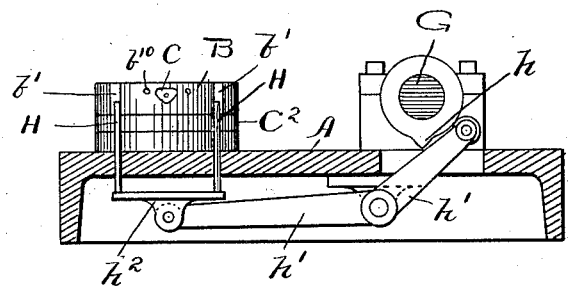

In the accompanying drawings, forming a part of this specification, Figure 1 is a plan view of the machine embodying the invention. Fig. 2 is a side elevation; Fig. 3, an end elevation; Fig. 4, a detail cross-section on the line 4 4 of Fig. 1. Figs. 5, 6, and 7 are detail sections on line 5 5 of Fig. 1, showing the parts in different positions. Fig. 8 is a detail section on line 8 8 of Fig. 9. Fig. 9 is a detail plan of the work-holder for the body, top ring, or breast of the can, pail, or other vessel upon which the ears are to be integrally formed. Fig. 10 is a side elevation of the same. Fig. 11 is a detail section on line 11 11 of Fig. 1; and Fig. 12 is a perspective view of the top portion, ring, or breast of the can or vessel upon which the integral ears have been formed.

Like letters indicate like parts in all the figures.

In the drawings, A represents the frame of the machine.

B is the movable work-holder or ring, which receives, supports, and holds the head, top, ring, or breast X of the can, pail, or vessel upon which the opposite bail-ears $x$ are to be formed integral therewith.

C C are the male ear-forming dies, the same being secured to a central interior die-holder or head C', fixed to a plate $C^2$ on the frame of the machine and by which the interior male dies C C are held in a fixed position in respect to the frame of the machine, while the work-holder B is adapted to reciprocate on or in respect to these interior dies. The work-holder B has diametrically opposite radial holes or bearings $b$, in which the dies C C fit, and the die-holder C' has a central raised portion having openings $C^3$ to receive the shanks $C^4$ of the dies C, said shanks being of smaller diameter than the dies to form shoulders $C^5$, that abut against the die-holder. Rubber or other springs B', interposed between the work-holder B and the die-holder C', serve to return the work-holder B to its normal position.

D D are reciprocating ear-forming exterior female dies which operate alternately in conjunction with the male dies C C to form first one of the bail-ears $x$ and then the diametrically opposite bail-ear $x$ on the sheet-metal ring or work X and integrally therewith. Each of the exterior reciprocating dies D is furnished with an independently-reciprocating punch or die F, forming the eye $x'$ in each of the bail-ears $x$. These eye-forming dies or punches F F enter central openings or holes $f$ in the interior male dies C C. Each of the female dies D is provided with a lip $d$, adapted to fit over the holder B and hold the sheet-metal ring X in position thereon while being operated upon. The holder B is also provided with spring guide-pins $b^{10} b^{10}$, between and upon which the ear projections of the ring X fit, which serve to guide, center, and hold the ring X in proper position to cause its ear projections to register with the dies C D C D. Each of the dies D is secured by set-screws $d'$ to a reciprocating slide D', which is operated by an eccentric $d^2$ on the counter-shaft $d^3$ through the adjustable connecting-link or pitman $d^4$. Each of the punches or eye-forming dies F is operated as required by a cam $f'$ on the counter-shaft $d^3$ through the connecting-lever $f^2$, link $f^3$, and lever $f^4$. A spring $f^5$ retracts the punch F.

H represents extractor-pins to discharge or deliver the ring or work X from the holder after the ears $x$ have been formed therein and the dies D D withdrawn and the work-holder B brought back to its normal position by the springs B', so as to withdraw the ring X from the male dies C C, and thus permit the removal or discharge of the ring X from the holder B. The extractor-pins H fit in slots $b'$ in the work-holder B to permit the necessary reciprocating movement of the work-holder. These extractor-pins H are given the required reciprocating movements up and down by means of a cam $h$ on the driving-shaft G, which operates through the connecting-lever $h'$, the inner arm of which is attached to a connecting-bar $h^2$, to which the extractor-pins are attached.

K is the clutch treadle or lever, by which the driving-shaft G is clutched to the loose power-pulley G'. This clutch mechanism may be of any suitable construction known to those skilled in the art. The connection, however, between the clutch lever or treadle and the cam-segment or block K' by which the clutch-pin is withdrawn is preferably furnished with a safety-trip $K^2$, operated by a cam $K^3$ through the lever $K^4$ to retract or disconnect the safety-trip, and thus prevent the clutch-head from operating the clutch except at the proper time—that is to say, at the completion of each revolution.

In operation after the ring X is placed on the holder B, as illustrated in Fig. 5, the right-hand exterior female die D advances against the corresponding male die C and pushes the work-holder B with it, thus forming one of the bail-ears $x$, and as this operation nears completion the eye-forming punch F moves forward likewise and forms the eye or hole $x'$ in the ear $x$. This die D then recedes and the opposite die D moves forward in like manner and forms the opposite ear $x$ on the other side of the ring X. After this is done and the dies D D have both been retracted the extractors H are operated and the ring or work X discharged.

I claim—

1. The combination with a pair of interior ear-forming male dies and an interior work-holder adapted to reciprocate in respect thereto, and a pair of reciprocating exterior ear-forming female dies operating to form alternately first one bail-ear and then the other, substantially as specified.

2. The combination with a pair of interior ear-forming male dies and an interior work-holder adapted to reciprocate in respect thereto, a pair of reciprocating exterior ear-forming female dies operating to form alternately first one bail-ear and then the other, and a pair of eye-punching dies, substantially as specified.

3. The combination with a pair of interior ear-forming male dies and an interior work-holder adapted to reciprocate in respect thereto, a pair of reciprocating exterior ear-forming female dies operating to form alternately first one bail-ear and then the other, said exterior female dies having projecting lips adapted to fit or lap over the work-holder, substantially as specified.

4. The combination with a pair of interior ear-forming male dies, a stationary die-holder therefor, a reciprocating work-holder, springs between the work-holder and die-holder to return the work-holder to its normal position, and a pair of reciprocating, exterior, ear-forming female dies operating to form alternately first one bail-ear and then the other, substantially as specified.

5. The combination with a pair of interior ear-forming male dies, a stationary die-holder therefor, a reciprocating work-holder, springs between the work-holder and die-holder to return the work-holder to its normal position, and a pair of reciprocating, exterior, ear-forming female dies operating to form alternately first one bail-ear and then the other, said work-holder having guide-pins to register the ear projections on the sheet-metal ring or work with the dies, substantially as specified.

6. The combination with a pair of interior ear-forming male dies, a stationary die-holder therefor, a reciprocating work-holder, springs between the work-holder and die-holder to return the work-holder to its normal position, and a pair of reciprocating, exterior, ear-forming female dies operating to form alternately first one bail-ear and then the other, and a pair of independently-operated eye-punching guides, substantially as specified.

7. The combination with a pair of interior ear-forming male dies, a stationary die-holder therefor, a reciprocating work-holder, springs between the work-holder and die-holder to return the work-holder to its normal position, and a pair of reciprocating, exterior, ear-forming female dies operating to form alternately first one bail-ear and then the other, a pair of independently-operated eye-punching guides, and extractor-pins for discharging the work from the holder, substantially as specified.

8. The combination with a pair of interior ear-forming male dies and an interior work-holder adapted to reciprocate in respect thereto, a pair of reciprocating exterior ear-forming female dies operating to form alternately first one bail-ear and then the other, and guide-pins on the work-holder for causing the ear projections on the sheet-metal ring or work to register with the dies, substantially as specified.

9. The combination with a pair of interior ear-forming male dies and an interior work-holder adapted to reciprocate in respect thereto, a pair of reciprocating exterior ear-forming female dies operating to form alternately first one bail-ear and then the other, and reciprocating extractor-pins for discharging the work from the work-holder, substantially as specified.

JOHN G. HODGSON.

Witnesses:
EDMUND ADCOCK,
H. M. MUNDAY.